May 10, 1949.  F. J. HENKEL  2,469,920
MACHINE TOOL

Filed Sept. 16, 1944  8 Sheets-Sheet 1

Inventor
Ferdinand J. Henkel
By Barthel & Bugbee
Attorneys

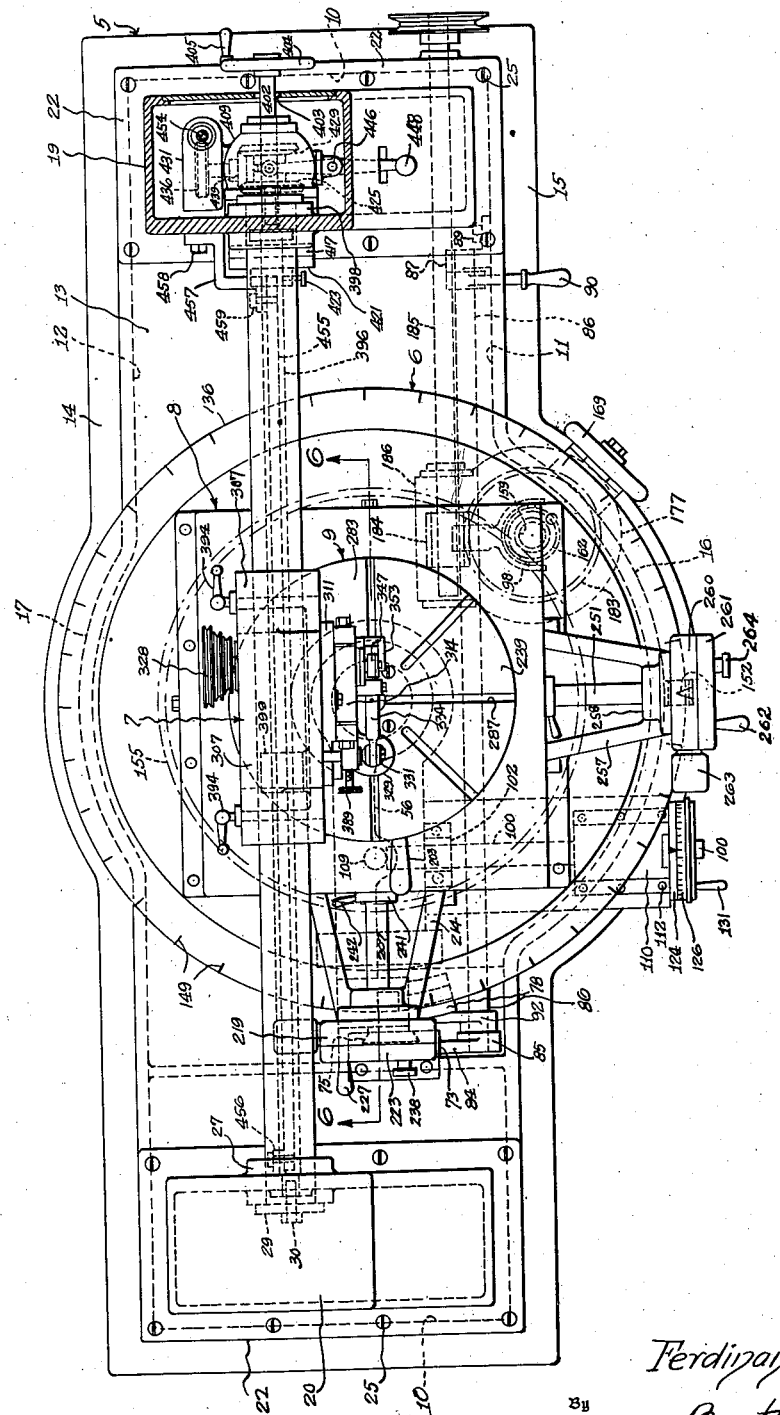

May 10, 1949. F. J. HENKEL 2,469,920
MACHINE TOOL
Filed Sept. 16, 1944 8 Sheets-Sheet 3
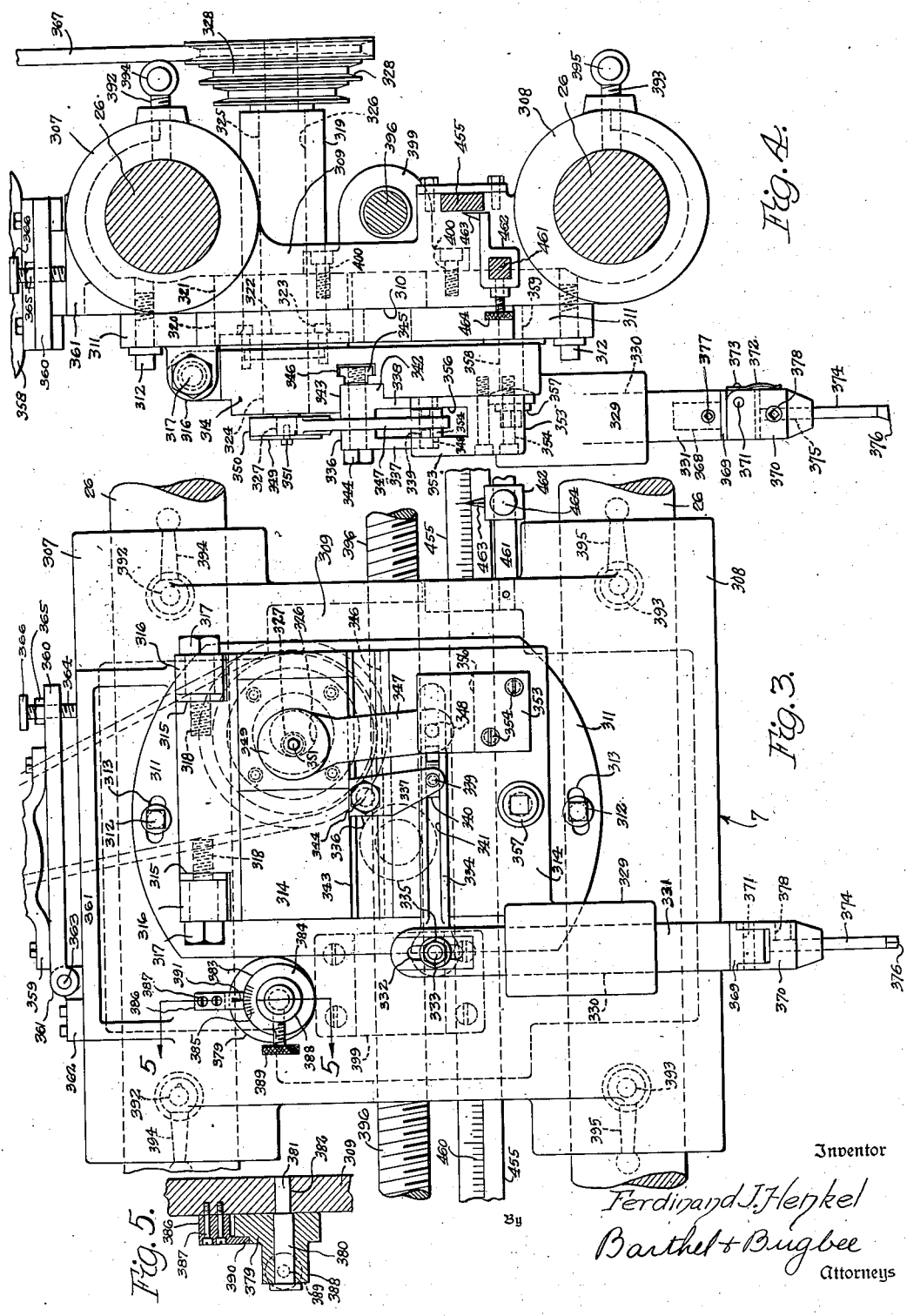
Inventor
Ferdinand J. Henkel
By Barthel & Bugbee
Attorneys May 10, 1949. F. J. HENKEL 2,469,920
MACHINE TOOL
Filed Sept. 16, 1944 8 Sheets-Sheet 4
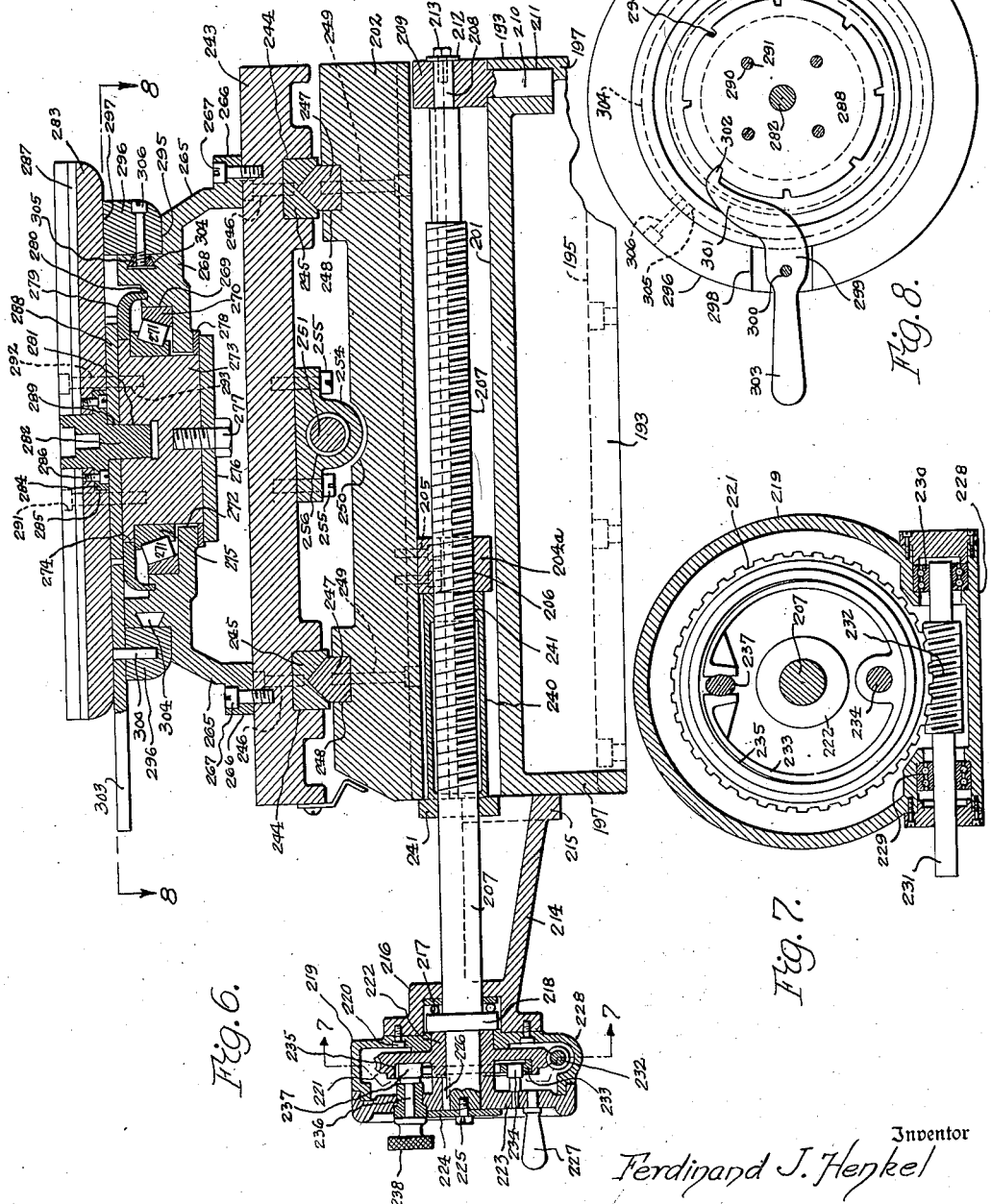
Inventor
Ferdinand J. Henkel
By Barthel & Bugbee
Attorneys May 10, 1949.  F. J. HENKEL  2,469,920
MACHINE TOOL Filed Sept. 16, 1944  8 Sheets-Sheet 5

Inventor
Ferdinand J. Henkel
By Barthel & Bugbee
Attorneys

May 10, 1949.  F. J. HENKEL  2,469,920
MACHINE TOOL
Filed Sept. 16, 1944  8 Sheets-Sheet 6

Inventor
Ferdinand J. Henkel
By Barthel + Bugbee
Attorneys

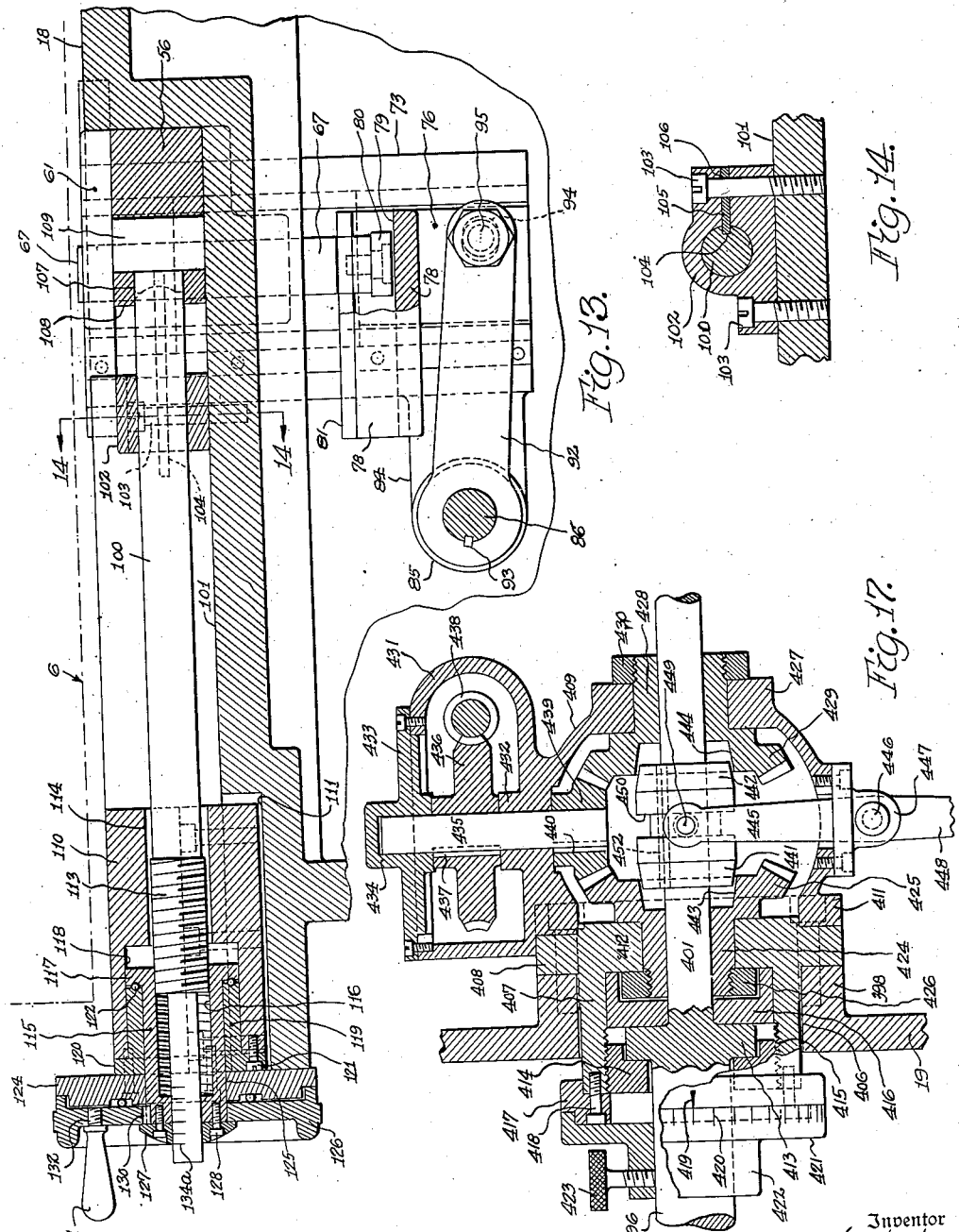

May 10, 1949.    F. J. HENKEL    2,469,920
MACHINE TOOL
Filed Sept. 16, 1944    8 Sheets-Sheet 8

Inventor
Ferdinand J. Henkel
By
Barthel & Bugbee
Attorneys

Patented May 10, 1949

2,469,920

UNITED STATES PATENT OFFICE 2,469,920

MACHINE TOOL

Ferdinand J. Henkel, Royal Oak, Mich., assignor to Lamina Dies and Tools, Inc., Berkley, Mich., a corporation of Michigan Application September 16, 1944, Serial No. 554,356

2 Claims. (Cl. 90—58)

The present invention relates to machine tools, and more particularly to a machine tool for making dies and the like where an extremely high degree of precision is required.

The primary object of the invention is to provide a machine tool in which the work to be operated upon is mounted for rotary and compound sliding movement to facilitate the positioning of the work with respect to the cutting tool during the cutting of arcuate portions as well as straight line portions tangent thereto with a high degree of efficiency and precision.

Another object of the invention is to provide a work table mounted for rotary movement and having detent means for locking the rotary carrier in various predetermined angular positions and at ten degree spaced apart locations throughout the entire 360 degree revolution.

Another object is to provide a rotary work support which has affixed thereto a compound slide to permit the offsetting of the work from the center of the rotary work support and to provide a cutting tool and carriage therefor having means for traversing said work carrier or support diametrically with respect to said rotary work support to produce various arcuate cuts and permit the quick and easy adjustment of the work to the required location with respect to the cutting tool during said arcuate cut.

Another object of the invention is to provide a rotary work support and indexing head with the indexing head mounted for compound rectilinear movement so as to position the work offset from the axis of the rotary work carrier and permit movement of a point on said work in an arcuate path beneath the cutter while in an offset position so as to cut the work in an arcuate path or form as well as permitting the cutting of straight-line portions tangent to the arcuate path or any other irregular path or shape desired.

Another object is to provide a rotary work support having means for locking the same at spaced intervals of ten degrees and to provide micrometric means for adjusting the rotary work support intermediate the ten degree locations or at any desired number of degrees other than multiples of ten.

Another object of the invention is to provide a machine tool having a rotary work table of the above-mentioned type which is adapted to be manually or mechanically rotated so as to permit suitable clutch means between said manual and mechanical means so as to permit the alternate use thereof and to simultaneously control the detent mechanism so that the rotary work table may be manually moved with one of its ten degree circumferentially spaced detent recesses therein in registry with the detent when it is desired to position the work table at a predetermined angular location.

Another object of the invention is to provide suitable control mechanism for the rectilinearly movable slide and to graduate said control mechanism in such a manner as to obtain a relatively high degree of precision and the production of work pieces within a relatively small tolerance range.

Another object of the invention is to provide a machine tool of the above-mentioned character in which the rectilinearly movable slide members may be mechanically or manually adjusted to provide means for locking said rectilinearly movable slides in their adjusted position.

Another object of the invention is to provide a machine tool of the above-mentioned character having an indexing head so as to permit the angular movement of the work to a predetermined position offset from the axis of the rotary work support or head and to provide replaceable templates for the indexing head with circumferentially spaced notches corresponding to the positions in which the work is to be cut.

Another object of the invention is to provide a machine tool of the above-mentioned type having a cutter carriage which is movable across the diameter of the rotary work support and which is provided with means for manually or mechanically adjusting or causing said carriage to traverse the diameter of said work support and also to provide means for adjusting the cutter to various positions of angularity in vertical and horizontal planes.

Another object of the invention is to provide a machine tool having a reciprocating cutter the length of stroke of which may be adjusted to any desired length depending on the thickness of the work being operated upon.

Other objects and advantages of the invention will become apparent during the course of the following description of the accompanying drawings, wherein:

Figure 2 is a top plan view of a machine tool illustrating the general arrangement of the several parts and showing a portion of one of the frame uprights broken away to illustrate the drive mechanism for the movable cutter carriage;

Figure 3 is an enlarged fragmentary front elevational view of the cutter mechanism illustrating the manner in which the carriage is supported and showing the cutting tool mounted for reciprocation thereon;

Figure 4 is an enlarged end elevational view of the cutting tool supporting carriage further showing the manner in which the same is supported for sliding movement and the various adjustments for the cutting tool;

Figure 5 is a vertical cross sectional view taken on line 5—5 in Figure 3 looking in the direction of the arrows and illustrating a cam member for adjusting the angularity of the cutting tool from a position perpendicular to the work table;

Figure 6 is a diametrical cross sectional view taken on line 6—6 of Figure 2 looking in the direction of the arrows and illustrating the various structural details of the compound slide and the indexing head carried thereby;

Figure 7 is a vertical cross sectional view taken on line 7—7 of Figure 6 looking in the direction of the arrows showing the drive mechanism and brake structure for controlling one of the rectilinearly movable slides;

Figure 8 is a horizontal cross sectional view taken on line 8—8 in Figure 6 looking in the direction of the arrows and illustrating the removable indexing plate for locking the indexing head in a preselected angular position depending upon the number and placing of the notches formed in the removable indexing plate;

Figure 13 is a vertical cross sectional view taken on line 13—13 of Figure 11 looking in the direction of the arrows and illustrating the various structural details of the detent slide mechanism as well as various details of construction of the micrometric adjustment therefor;

Figure 14 is a vertical cross-sectional view taken on line 14—14 of Figure 13 looking in the direction of the arrows to illustrate the manner in which the detent adjusting bar is keyed against rotation;

Figure 1:
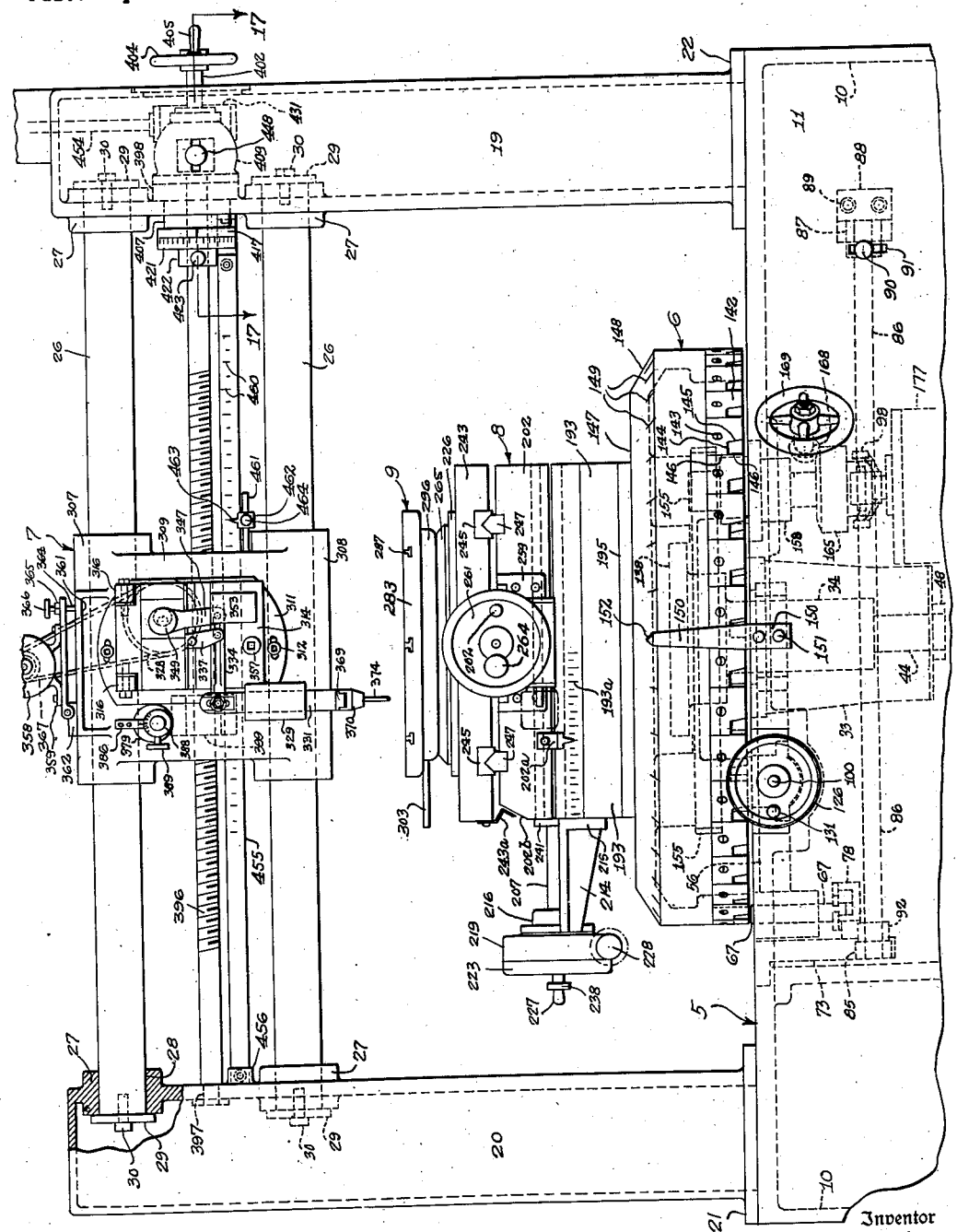
Figure 1 is a front elevational view of the machine tool showing the arrangement of the several parts and illustrating the position of the movable cutter member relative to the work support.
Figures 11, 12:
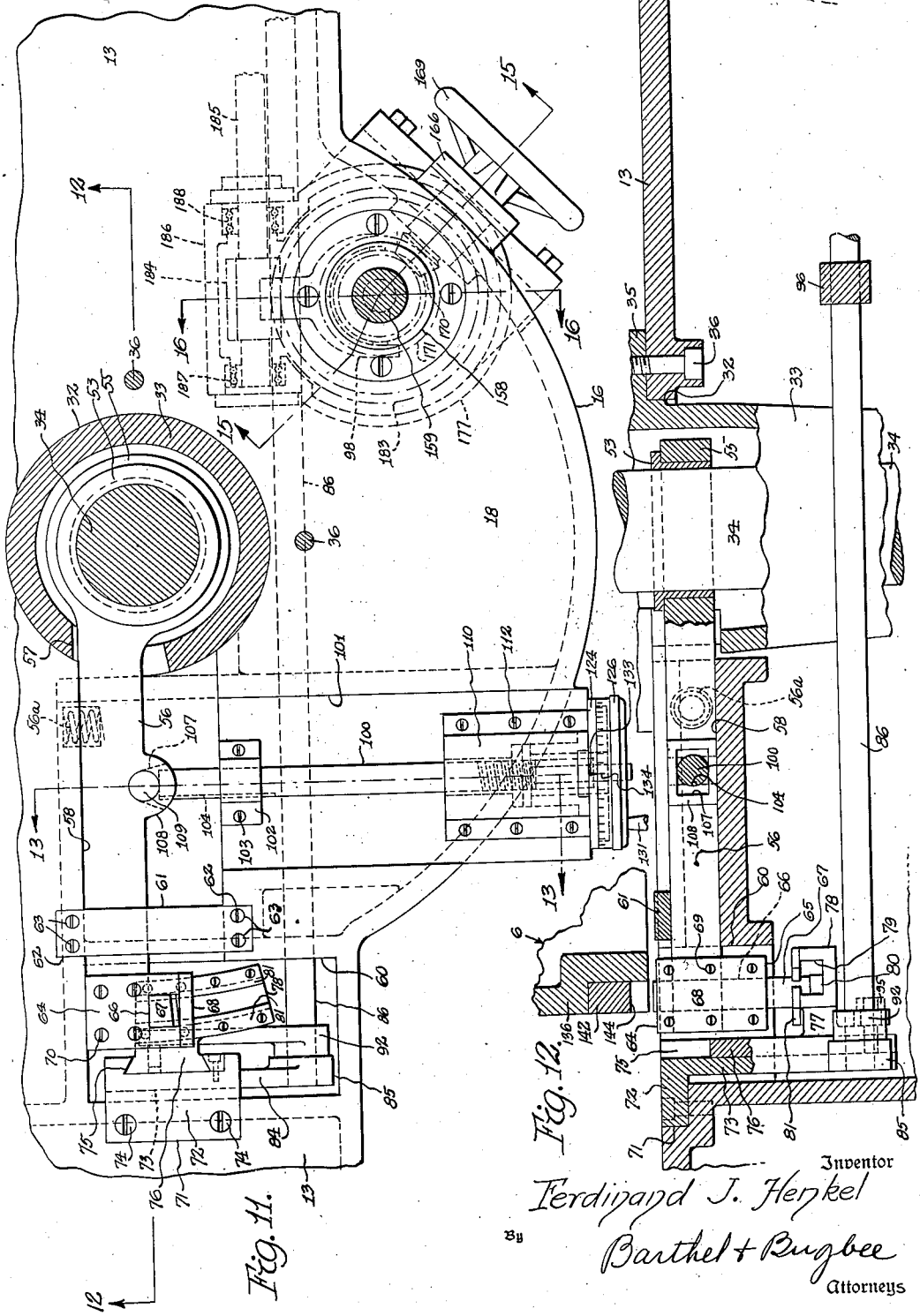
Figure 11 is a fragmentary top plan view of the bed or base portion of the machine tool illustrating the micrometric adjusting mechanism for locking the rotary work table in a predetermined angular position.
Figure 12 is a vertical cross sectional view on line 12—12 of Figure 11 looking in the direction of the arrows and further illustrating the micrometric adjustment and detent mechanism for controlling the angular movement of the rotary work table or carrier.
Figures 15, 16:
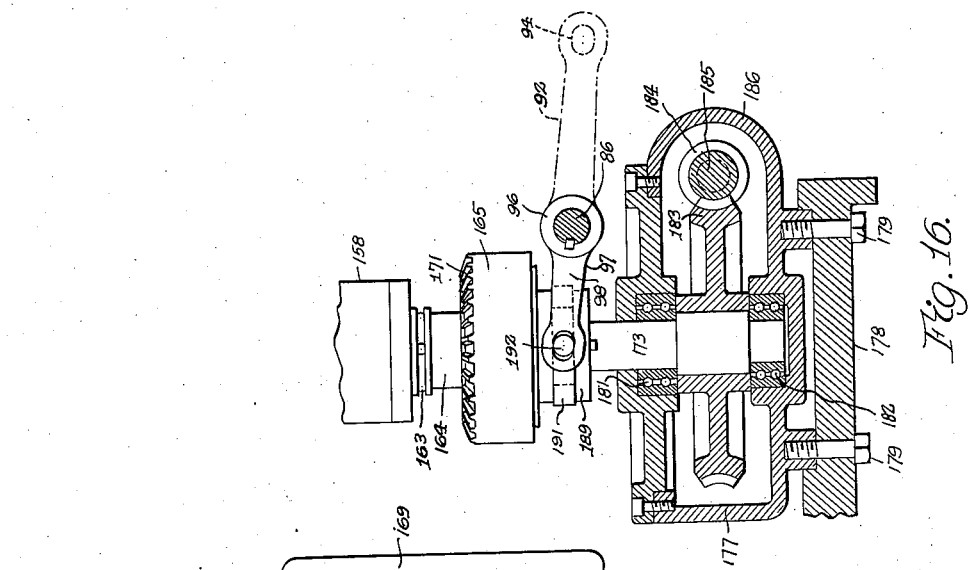
Figure 15 is a vertical cross sectional view taken on the oblique line 15—15 in Figure 11 showing the alternate control means for rotating the rotary work table or carrier and illustrating various structural details of the drive mechanism and the clutch structure.

Figure 16 is a vertical cross sectional view taken on line 16—16 of Figure 11 looking in the direction of the arrows illustrating the clutch control mechanism and the mechanical drive for the rotary work table or carrier; and Figure 17 is a vertical cross sectional view taken on line 17—17 of Figure 1 looking in the direction of the arrows illustrating various structural details of the mechanical and manual drive means for traversing the cutter carriage in a path diametrical to the rotary work table or support.

Brief description of the invention

Broadly, the invention comprises a rotary work carrier mounted on a suitable base or bed and provided with means for rotating said carrier as well as means for manually moving said carrier to various angular positions so that the carrier may be locked in said angular positions and held against displacement. In order to enable the work carrier to be mechanically and manually controlled, a suitable clutch mechanism is provided so as to drivingly connect the manual control means to the rotary work table in one of the two clutching positions of said clutch and to drivingly connect the mechanical rotating means with said carrier in the other of said clutch positions. When the clutch mechanism is moved to the first-mentioned position, a detent mechanism is operated to project a locking bolt into engagement with one of a series of recesses in a work table which are circumferentially spaced ten degrees apart so as to facilitate the positioning and locking of the work table or carrier in a number of different angular locations. Micrometric means is provided for adjusting the detent to accommodate angular positions intermediate said ten degree spacing so as to permit the setting of the table at any desired angular degree of rotation.

The cutter carriage for the reciprocating cutter is mounted directly above the rotary work table or carrier to move diametrically across the axis thereof and suitable control mechanism (both manual and mechanical) is provided for moving the cutter carriage to either a predetermined position or for driving said carriage at a relatively slow rate of speed, so as to feed the cutting tool with respect to the work. The work is mounted on an indexing head carried by a compound slide secured to the rotary work carrier or table, and said compound slide is controlled by manual and mechanical means to permit the offsetting of said indexing head relative to the cutting tool when the rotary work carrier is being moved to cause the cutting tool to describe various cuts in the work piece. The indexing head is provided with a removable and replaceable indexing plate for moving the work to various angular positions corresponding to the cut desired in the work piece so that by removing said indexing plate and replacing the same with one having differently arranged circumferentially spaced notches, the work may be brought into proper register with the tool which as mentioned above, is mounted directly above the rotary work table or carrier.

The various adjustments of the machine tool are calibrated to afford the highest possible degree of precision and the production of work pieces to the exact dimensions required. Further, the reciprocating cutting tool is mounted on the slide in such a manner as to facilitate the adjustment thereof in different planes at right angles to one another so that the cutting tool may be angled from the perpendicular for the purpose of cutting work pieces requiring slightly tapered walls such as die members and the like. Various movements imparted to the rotary work carrier or table and compound slide as well as the cutter carriage are accomplished by means of reduction gearing and motor drive mechanism so as to produce the necessary cutting speed when making various cuts of straight line or arcuate shape as well as cuts of irregular shape.

*General arrangement and frame structure*

In the drawings, Figures 1 and 2 show a machine base or bed 5 upon which is mounted the rotary work table or turntable 6. The tool carriage 7 is mounted above the rotary work table or turntable 6 for supporting the tool in position for engaging the work which is carried by an indexing head 9 mounted for rectilinear movement on a compound slide 8.

The frame structure includes a base 5 having end walls 10, front and rear walls 11 and 12 respectively for supporting a top wall 13. The end, front and rear walls are flanged as at 14 and 15 (Figure 2) to rest upon a floor surface or other support and permit the fastening of said base 5 to said floor surface if desired. The front and rear walls 11 and 12 are arcuately curved as at 16 and 17 intermediate their ends and the top wall 13 is enlarged as at 18 to form a disc-like surface corresponding in circular shape to the rotary work table or turntable 6.

Extending upwardly from the end portions of the base 5 is a pair of frame uprights 19 and 20 which, as shown in Figure 2 are of hollow construction and are tapered from their flanged ends as at 21 and 22 to the uppermost portions thereof. The flanged ends 21 and 22 are adapted to be secured to the top wall 13 of the base 5 by machine screws or bolts 25. The upper ends of the frame uprights 19 and 20 are connected by a pair of horizontal bars 26 (Figure 1) which are suitably spaced and have their ends mounted in bosses 27 formed on the inner walls of said upright frame members so as to pass through openings 28 in said bosses and be held in position by clamping plates 29 affixed to the ends of the bars 26 by retaining bolts or the like as at 30. The bars 26 are adapted to form a guide for the cutter carriage 7 and are mounted in vertical alignment relative to one another. It is to be noted that the guide bars 26 are slightly offset from the center of the circular base portion 18 to facilitate the proper positioning and mounting of the reciprocating cutter.

The central portion 18 of the base 5 (Figures 12 and 15) is provided with an enlarged opening 32 in which is received a bearing support 33 for supporting a rotary shaft 34. The bearing support 33 is of tubular construction and tapers slightly from the upper end thereof to the lowermost end and said tubular bearing support is flanged as at 35 to overlie the edge of the central opening 32 so as to be fastened in place by circumferentially spaced machine screws or the like as at 36. The upper and lower portions of the tubular bearing support 33 are cut away as at 37 and 38 for receiving antifriction race members 39 and 40 respectively for accommodating a series of anti-friction rollers 41 and 42 (Figure 15). Similarly, the rotary shaft 34 is cut away as at 43 and 44 for receiving inner race members 45 and 46. The inner race members 45 may be pressed in position while the lower race member 46 is held in place by a washer 47 and suitable lock nut 48 on the lower screw-threaded end 49 of said shaft. A cover plate 50 is secured to the lowermost end of the bearing support 33 and is held in place by screws or the like 51. Formed integral with the bearing support 33 and extending inwardly from the upper end thereof is an annular flange 52 the free end of which is adapted to engage the collar 53 mounted on the rotary shaft 34 and encircling said collar is the hub portion 55 of an adjustable arm member 56 (Figures 11 and 12) which projects through a circumferential slot 57 in the peripheral wall of the bearing support 33 and extends into a longitudinal recess 58 formed in the round portion 18 of the top wall of the base. The free end of said adjusting arm 56 extends into a rectangular opening 60 and is held against vertical displacement by means of a guide plate 61 which has its end received in recesses 62 at each side of the recess 58 so as to be anchored therein by machine screws 58 or the like as at 63 (Figure 11). Affixed to the extreme free ends of the adjusting arm 56 on the top and bottom thereof is a pair of guide plates 64 and 65 which are notched as at 66 to form a guide for a vertically movable detent pin or bolt 67. A front plate 68 is affixed to the guide plates 64 and 65 by means of screws or the like as at 69 and said guide plate 64 may similarly be held in place by machine screws or the like as at 70. It will thus be seen that the adjusting arm 56 is mounted to move in the recess 58 about a predetermined angular distance below the surface of the top wall 13 of the base so as not to interfere with movement of the rotary work table or support 6. A coil spring 56a has one of its ends received in an opening in the vertical wall of the recess 58 while its other end is received in an opening in the lever 56 to cause said lever to follow the adjusting rod 100 upon manipulation of the hand wheel 126.

The top wall 13 of the base 5 is recessed as at 71 for receiving the flanged portion 72 of a guide bracket 73 (Figures 11 and 12) and said flange 72 is held in said recess by means of machine screws or the like 74. Slidably mounted in a dovetailed slide 75 in the guide bracket 73 is a slide 76 which has a foot portion 77 for supporting an arcuately curved guide plate 78. The arcuately curved guide plate 78 is provided with a slot 79 for receiving the enlarged head 80 of the locking detent or bolt 67 and retaining flanges 81 are affixed to the slide plate 78 by screws or the like for preventing displacement of said enlarged bolt head 80. It will thus be seen that the adjusting arm 56 may move through a predetermined arc carrying with it the detent bolt 67 the lower end of which is guided in the arcuate slide plate 78 supported on the lower end of the vertical slide 76.

Formed integral with the slide bracket 73 and extending forwardly therefrom is an arm extension 84 (Figure 11) having a bearing boss at the free end thereof for supporting one end of a control rod 86. The opposite end of the control rod 86 (Figure 1) is supported in the bearing portion 87 of a bearing bracket 88 which is affixed to the front wall 11 of the base 5 by suitable screws or the like 89. One end of the control rod 86 has affixed thereto a manual operating lever 90 which projects through a vertical slot 91 in the front wall of the base 5 while the opposite end of the control rod 86 has affixed thereto a slide operating lever 92 (Figure 13) held in place against rotation by means of a suitable key or the like as at 93. The free end of the control rod lever 92 is provided with an elongated slot or opening 94 for receiving a screw 95 anchored in the lower end of the vertical slide 76. The intermediate portion of the control rod 86 has affixed thereto a collar 96 (Figure 16) of a yoke lever 97 having yoke arms 98 which are adapted to control a clutch mechanism which will be hereinafter more fully described.

In order to adjust the oscillating arm 56 to various angular positions so that the detent bolt 67 may be moved through an arc of approximate ten degrees (Figure 13), an adjusting rod 100 is arranged in a recess 101 in the top wall portion 18 of the base 5 and said adjusting rod has one of its ends journalled in a bearing bracket 102 affixed to the bottom wall of the recess 101 by screws or the like as at 103. The adjusting rod 100 is provided with a longitudinal slot 104 (Figure 14) for receiving a key 105 held in a slot 106 in the bearing bracket 102 by means of one of the anchoring screws 103 so that the inner edge of said key will project into said key slot 104 and prevent relative rotation of the adjusting shaft 100. The inner end of the adjusting rod 100 extends into a cavity 107 extending inwardly from a lateral projection 108 (Figure 11) formed on said adjustment arm 56 and mounted in said cavity 107 transversely of the lateral extension 108 is a roller or pin 109 to present a curved surface for contactual engagement with the extreme inner end of said adjusting rod 100.

The other end of said adjusting rod 100 projects into a bearing member 110 (Figures 11 and 13) received in a recess 111 in the floor of the recess 101 and said bearing member is held in place by machine screws or the like as at 112. The outer end of the adjusting shaft 100 is slightly enlarged and screw-threaded as at 113 and extends into the bore 114 of said bearing member 110 and is drivingly engaged within a tubular nut 115 the bore 116 of which is screw-threaded to correspond with the screw threads 113 on the adjusting shaft 100. One end of the threaded tubular nut 115 is flanged as at 117 and is received in the enlarged portion 118 of the bore 114 as illustrated in Figure 13. A tubular sleeve 119 is fitted in the enlarged bore 118 of the bearing member 110 and has its flange 120 held in place by machine screws or the like as at 121. Anti-friction bearings 122 are interposed between the end of the sleeve 119 and the flange 117 to permit free rotation of the tubular threaded nut 115. Secured to the tubular bearing member 110 is a disc 124 held in place by suitable screws and said disc is provided with an opening 125 for permitting the rotary tubular nut 115 to project therethrough so that a hand wheel 126 may be affixed thereto by the clamping plate 127 and machine screws 128. The extreme outer end of the shaft 100 is reduced and graduated as at 134a so as to slide in and out of suitable openings in the tubular threaded nut 115 and clamping plate 127. The hand wheel 126 is keyed to the rotary tubular threaded nut 115 as at 130 and a handle 131 is secured to the hand wheel 126 as at 132 to facilitate rotation of the tubular threaded nut 115 to thereby impart longitudinal movement to the adjusting shaft 100. The disc 124 is provided with a graduation mark 133 adapted to register with a series of graduation marks 134 on the peripheral surface of the rotary hand wheel 126. The screw and nut 113 and 115 respectively provide a micrometric adjustment for the adjustable arm 56. It is intended that the graduations 134a on the outer end of the shaft 100 and the graduations 134 on the hand wheel 126 be marked to denote trigonometric sine functions so that once the angle of rotational adjustment of the table 6 is determined, the sine of said angle may be determined, by consulting a trigonometric sine table, and the shaft 100 adjusted by setting the same to correspond with the sine function of the angle.

*Rotary work table and operating mechanism therefor*

Mounted on the upper end of the rotary shaft 34 (Figure 15) is the rotary work table or support 6 and said support is of disc-like construction and includes a body portion 135 having a peripheral depending flange 136. The central portion of the rotary work support 6 is provided with a round recess 137 for receiving the flanged end 138 on the enlarged portion 139 thereof (Fig. 15). Machine screws or the like as at 140 are provided for holding the flanged portion 138 of the shaft 34 within said round recess 137. Extending inwardly from the peripheral surface of the depending flange 136 is an annular recess 141 and mounted within said recess is a series of blocks 142 fastened in place by means of suitable machine bolts or the like as at 143. Formed in each of the blocks 142 is a notch 144 (Figure 1) the side wall of which as at 145 is angled to receive the bolt 67 in such a manner as to center said rotary work table or support 6 at exactly ten degree spaced apart distances. The side walls 146 of said blocks 143 are perpendicular and cooperate with the notches 144 to provide a straight wall surface for engaging and receiving the upper end of said bolt 67. It will thus be seen that as the rotary work table 6 is brought into approximate registry with the bolt 67, the projection of the bolt will cause the upper end thereof to engage the inclined wall 145 of the notch 144 and thereby move the rotary work table or support 6 slightly in a counter-clockwise direction so the table is exactly positioned on said ten degree marking. The top wall 147 of the work table is bevelled as at 148 and is provided with a series of graduations 149 aligned with the straight wall surfaces 146 of the blocks 143. A pointer 150 is affixed to the cylindrical portion of the bed 11 by means of screws or the like as at 151 so that the end thereof as at 152 will register with the series of graduations 149 as indicated in Figure 1. The graduations 149 are spaced an angular distance of ten degrees from one another so that the rotary table or support 6 may be turned through any number of graduations and locked in a radial position of ten degrees or multiples thereof.

In order to facilitate the rotation of said work table or support 6 (Figure 15), the under side thereof is provided with an annular depending rib 153 having a recess for receiving a ring gear 154 provided with external teeth 155. The ring gear is held in place by a machine screw or the like 156 to the under side of said annular depending rib 153. The round intermediate portion 18 of the bed or frame 13 is provided with an opening 157 (Figure 15) for receiving a bearing sleeve 158 which is adapted to rotatably support a rotary shaft 159. Suitable bearings 160 and 161 are mounted in the upper and lowermost ends of the tubular bearing support 158 respectively to permit free rotation of said shaft 159. The uppermost end of the rotary shaft 159 is provided with a pinion 162 adapted to mesh and drivingly engage the ring gear 154 so as to rotate said rotatable support or table 6 upon rotation of the shaft 159. A thrust bearing 163 is mounted on the lower end of the shaft 159 and is located between the tubular bearing support 158 and the hub 164 of a cone clutch 165. Rotatably mounted in a bearing 166 secured in a bearing boss 167 of the curved front wall 16 of said frame 13 is a rotary shaft 168 having affixed to one end thereof a hand wheel 169 to facilitate rotation of said shaft while the other end of said shaft is provided with a bevel gear 170 adapted to mesh and drivingly engage bevel gear teeth 171 formed on the cone clutch member 165. The other cone clutch element 172 of said cone clutch 165 is carried by a rotary shaft 173 and is keyed to the upper end thereof by means of keys or the like as at 174. The upper end of the shaft 173 is provided with an axial bore 175 for receiving a projection 176 on the end of the shaft 159 so as to retain said shaft 173 in alignment with the shaft 159. The lower end of the shaft 173 is received in a gear housing 177 which is supported on an inwardly extending shelf or platform 178 formed integral with and extending inwardly from the arcuately curved front wall 16 of the intermediate portion of said base or bed 13. Machine screws or the like 179 are provided for retaining the gear casing 177 in place and it is to be noted that a portion thereof projects through an opening 180 in the front curved wall 15 of the machine bed or frame of sufficient size to permit the removal of said gear casing for the purpose of repairs or the like. The shaft 173 is journaled in suitable anti-friction bearings 181 and 182 in the top and bottom walls of the gear casing 177 respectively, and keyed to said shaft intermediate said anti-friction bearings is a worm wheel 183 adapted to be drivingly engaged by a worm 184 (Figure 16) on a suitable drive shaft 185. The drive shaft 185 is rotatably mounted in an extension 186 formed integral with the gear casing 177 and is supported by anti-friction bearings 187 and 188 adjacent each end of the casing extension 186 (Figure 11). The shaft 185 is adapted to be driven by an electric motor having a thymotrol reduction unit so as to facilitate rotation of said shaft 185 at a relatively slow rate of speed.

The thymotrol control motor unit may be of electronically controlled type or, if desired, other types of speed reduction units may be employed.

The clutch element 172 of the cone clutch 165 (Figure 15) has its collar 189 grooved as at 190 to receive a ring 191 having diametrically opposed pins 192 for being received in suitable openings formed in the yoke arms 98 as illustrated in Figure 16. It will thus be seen that operation of the shaft 86 by the control lever 99 will project the bolt 67 and simultaneously disengage the clutch part elements 165 and 172 so as to permit operation of the hand wheel 169 and impart rotation to the rotary work table support 6 a predetermined distance so as to bring the bolt 67 into registry with one of the notches 144 and place the rotary work table an angular distance from the reference point 152. When the rotary shaft 86 is moved in the reverse direction by the control lever 90, the bolt 67 will be withdrawn or retracted and the clutch parts 165 and 172 engaged so as to permit the driving of said table through the gearing and gear housing 186 by the thymotrol controlled motor connected to the shaft 185.

*Compound slide structure*

Figure 9:
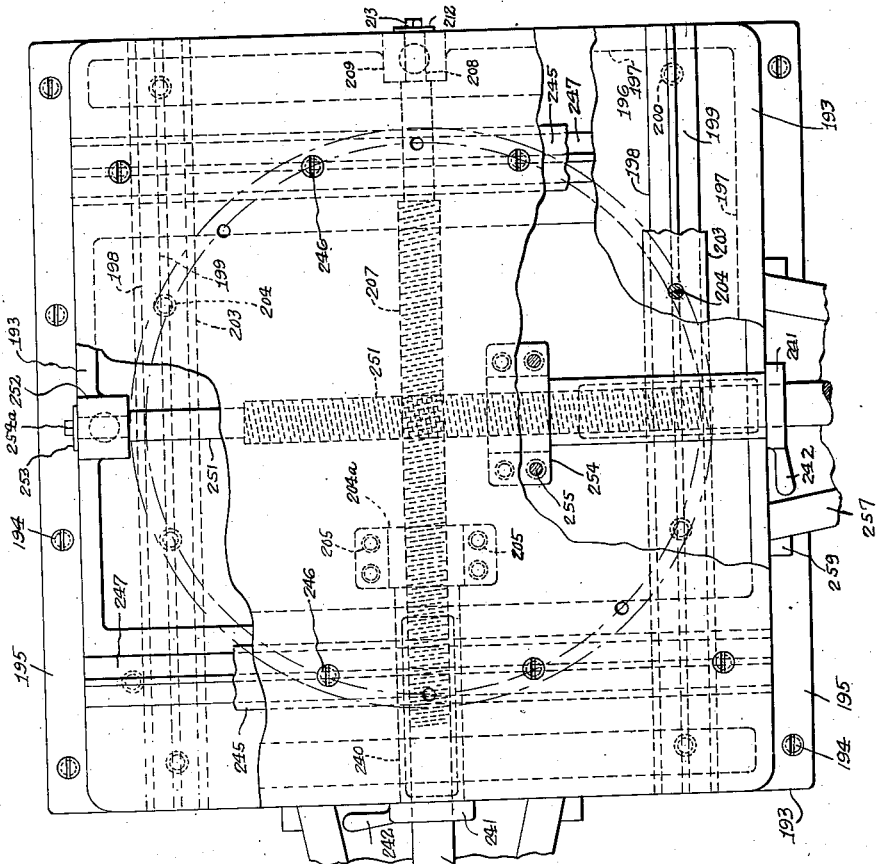
Figure 9 is a top plan view of the compound slide with the indexing head removed therefrom.
Figure 10:
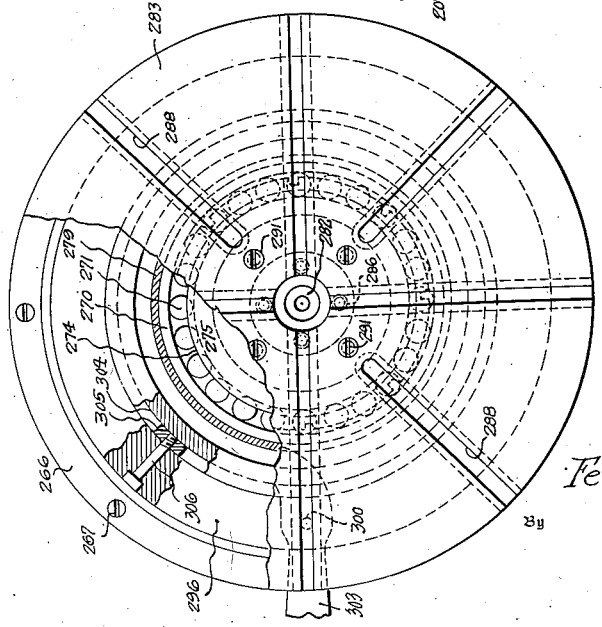
Figure 10 is a fragmentary plan view of the indexing head showing a portion thereof broken away for the purpose of illustrating various structural details thereof.

Secured to the top wall 147 (Figure 1) of the rotary work table or support 6 is a slide table 193 which is held in place by means of suitable bolts 194 extending through a flange 195 thereof and said table comprises a top wall 196 and side walls 197 as illustrated in Figures 6 and 9. The top wall 196 of the slide table is transversely recessed or grooved adjacent each end as at 198 for receiving slide bars 199 held in place by means of machine screws or the like as at 200 (Figure 9).

Extending transversely of the slide table 193 and parallel with the slide bars 199 is a longitudinal recess 201 and slidably mounted on the top 196 of the slide table is a slide 202 having complementary slide guides 203 for resting upon the slide bars 199. The slide guides 203 are mounted in transversely extending recesses similar to the grooves 198 and are held in place by machine screws or the like as at 204. It will thus be seen that the slide 202 may move transversely relative to the slide table 193 and to facilitate the sliding movement thereof (Figure 6) a threaded block 204a is secured by screws 205 to the underside of the slide 202 and is adapted to depend downwardly into the longitudinal slot or groove 201. The block 204a is provided with a threaded opening 206 for receiving a feed screw 207 housed within the transverse grooves or longitudinal slots 201. One end of the feed screw 207 is reduced as at 208 and is received in a bearing block 209 held in place by a short stud 210 which is received in an opening 211 at one end of the longitudinal slot or groove 201. A retaining washer 212 is held in place by a machine screw or the like 213 to prevent axial or endwise movement of the feed screw shaft 207. The opposite end of the screw feed shaft 207 is supported by a bearing bracket 214 which has its flanged portion 215 secured to the slide table 193 by machine screws or other fastening elements and said bearing bracket is provided with a bearing portion 216 having anti-friction bearings 217 for engaging an annular enlargement 218 on the screw-threaded feed shaft 207 so as to prevent end thrust and retain said shaft in position. A gear casing 219 is affixed to the bearing portion 216 and the bracket 214 by means of screws or the like as at 220 and said gear housing is positioned so as to receive the extreme outer end of the screw feed 207.

Rotatably mounted on the end of the screw feed shaft 207 is a worm wheel 221 having its hub 222 in abutting relationship with the annular enlargement 218 as illustrated in Figure 6. Secured to the end of the feed screw 207 is a hand wheel 223 held in place by a retaining washer 224 by means of a screw or the like 225. A key 226 is provided for drivingly connecting the hand wheel to the screw feed 207 and a handle 227 is mounted on the hand wheel to impart rotation thereto. The gear housing 219 is provided with an offset portion 228 (Figure 7) having anti-friction bearings 229 and 230 at each end thereof for supporting a drive shaft 231. A worm 232 is secured to the drive shaft and is adapted to drivingly engage the worm wheel 221 so as to impart rotation to the screw feed 207 by mechanical means. An electric motor may be supported by the bearing bracket 214 or gear housing 219 with its armature shaft in alignment with the drive shaft 221 so as to be coupled thereto by means of a thymotrol speed reduction unit similar to the drive shaft 185 as explained in connection with the rotary work table or support 6. In order to drivingly connect the hand wheel 223 with the worm wheel 221 when it is desired to manually rotate or control the feed screw 207, a friction clutch element is provided and said friction clutch element includes an expansible shoe member 233 mounted on a stud 234 secured to the worm wheel 221. The friction shoe 233 is located in a recess or annular cavity 235 in one of the radial walls of the worm wheel 221 so that when said friction shoe element is expanded, the same will engage the interior peripheral wall of said recess 235 and lock said friction shoe element thereto. In order to expand said friction shoe element 233 a shaft 236 (Figure 6) is mounted in a suitable bearing in the hand wheel 223 and said shaft is provided with a control cam 237 on one end thereof for engaging the ends of said friction shoe element 233 and expanding the same upon rotation of the control shaft 236. A control knob 238 is affixed to the outer end of the control shaft to facilitate manual rotation thereof and permit the hand wheel 223 to be locked to the worm wheel 221 for the mechanical driving of the screw shaft 207.

Movably mounted on the screw feed 207 is a telescopic sleeve 240 (Figure 6) having a reduced threaded portion 241 for receiving the threaded portion of the screw feed 207. The opposite end of the telescopic tube 240 is enlarged as at 241 and provided with a handle 242 (Figure 9) to facilitate the rotation of the telescopic tube 240 along the threaded portion of the screw feed 207 so as to protect the same against metal chips finding their way to the feed screw 207.

Slidably mounted on slide 202 for movement in a direction at right angles to the sliding movement of said slide 202 is another slide 243 (Figure 6) having parallel longitudinal grooves 244 adjacent each edge thereof for receiving slide guides 245 which are held in place by machine screws or the like as at 246. The slide guides 245 are adapted to ride on slide bars 247 mounted in parallel grooves 248 in the top of the slide 202. Machine screws or the like as at 249 are provided for holding the slide bars 247 in position and against removal from the parallel grooves 248. The top wall of the slide 202 is recessed as at 250 for accommodating a rotary feed screw 251 which is supported at one end of the slide 202 by means of a bearing bracket 252 (Figure 9) similar to the bearing block 209 but held in place by being integrated with the underside of the slide 243 at one end thereof. A retaining washer 253 held in place by a screw 254a is provided for holding the feed screw 251 in place against axial movement.

Mounted on the underside of the slide 243 adjacent the opposite end thereof is a bearing bracket 254 held in place by machine screws or the like as at 255 and said bearing bracket is provided with a threaded opening 256 threadedly engaging the screw feed shaft 251. The opposite end of the feed screw 251 is supported by a bearing bracket 257 (Figure 2) having an enlarged bearing portion 258 at one end thereof and being flanged as at 259 at the other end for attachment to the side wall of the slide 202. A gear housing 260 is carried by the free end of the bearing bracket 257 and is identical in construction with the gear housing 219 shown in Figure 6. A hand wheel 261 is keyed to the feed screw 251 and is provided with a handle 262 to facilitate rotation thereof. An electric motor 263 having a thymotrol speed reduction unit is supported by the gear housing 260 so that its armature shaft may be drivingly connected to the rotary feed screw 251 by means of an expansible shoe element similar to the shoe element 233 by manually controlling the knurled control member 238 on the hand wheel 261. Rotation of the knurled hand control 264 as in the case of the knurled hand control 238 will effect the alternate connection of the motor 263 to the rotary feed screw 251 in substantially the same manner as pointed out and described in connection with the manual and mechanical drive shown in Figure 6.

*Work holding structure and indexing head*

Mounted on the slide 243 (Figure 6) is an annular casting 265 flanged as at 266 for receiving anchoring screws or the like as at 267 so as to securely bolt said annular casting in place. The annular casting is provided with an inwardly extending flange 268 having an annular recess 269 for receiving the outer race member 270 of an anti-friction bearing having roller thrust bearings 271. The annular flange 268 terminates in an opening 272 which is adapted to receive a rotary drum 273 which is provided with an annular flange 274 arranged in abutting relationship with the inner race member 275 of said anti-friction bearing. A retaining disc 276 is held in place by means of a machine screw 277 so as to prevent displacement of the drum 273 by reason of the fact that the retaining disc 276 overlaps the edge of the opening 270 by a sufficient amount to prevent upward movement thereof. A bearing washer 278 is interposed between the retaining disc 276 and the under side of the inwardly directed flange 268. A grease-retaining shield 279 is anchored to the inwardly directed flange 268 within an annular groove 280 thereof so as to retain grease in the anti-friction bearing 271 and prevent the entrance of foreign matter thereto.

The central portion of the drum 273 is provided with a tapered bore 281 (Figure 6) for receiving a centering plug 282 secured to a work holding disc 283. The centering plug 282 is flanged as at 284 and this portion is received in an annular opening 285 in the underside of the work holding disc 283 so as to be securely retained therein by means of machine screws or the like as at 286. The top wall of the work holding disc 283 may be provided with a series of radially extending undercut slots 287 for receiving the head of an anchoring bolt or other work holding fixture.

Interposed between the work holding disc 283 and drum 273 is an indexing plate or disc 288 having a central opening 289 for receiving the centering pin 282 as illustrated in Figures 6 and 8. The indexing disc 288 is provided with radially disposed apertures 290 for receiving retaining bolts 291 which extend through openings 292 in the work holding disc 283 and have their lower ends received in threaded openings 293 in the drum or head 273. A series of circumferentially spaced notches 294 are formed in the peripheral edge of the indexing disc 288 and are adapted to be engaged by a detent to retain the work holding disc 283 in a predetermined angular position.

The annular casting 265 is provided with an annular recess 295 for the reception of an annulus or ring 296 which is freely rotatable in the annular recess 295 and is provided with a relatively flat wall surface 297 forming a seat for engaging the under surface of the rotary work table 233 so as to support said work table or holder without permitting wobbling or uneven motion thereof.

The annulus or ring 296 is cut away as at 298 for receiving a detent 299 which is held in place by a short pivot pin 300 (Figure 8). One end of the detent 299 is arcuately curved as at 301 and terminates in a laterally extending portion 302 shaped like and engageable with any one of the notches 294 in the indexing plate or disc 288. The other end of the detent 299 is provided with a handle portion 303 to facilitate the movement of the detent 301. Inwardly extending from the annular recess or groove 295 is an annular dovetailed groove 304 in which there is received an arcuately curved dove-tailed locking plate 305 adapted to be moved into clamping position in the dove-tailed slot 304 by means of a clamping screw as at 306. The clamping screw extends through an opening in the ring 296 with its inner threaded end received in a correspondingly threaded opening in the arcuately curved dovetailed clamping member 305.

It is intended to provide a plurality of indexing discs 288 for various purposes and different types of work with the detent notches 294 spaced at various circumferential distances from one another so that indexing of the work may be accomplished at points corresponding to the location of the detent notches 294. One edge of the slide table 193 is bevelled (Figure 1) and provided with a series of graduations 193a so that a pointer 202a affixed to the slide 202 may register therewith to indicate the relative movement between the slide table 193 and slide 202. Similarly, one edge of the slide 202 is bevelled in the direction of slide movement and is graduated as at 202b so that a pointer 243a affixed to the slide 243 may register therewith and indicate the distance that the slide 243 is moved relative to the slide 202.

*Cutting tool carriage and traversing screw therefor*

Mounted upon the horizontal guide bars 26 is a cutting tool carriage generally designated by the reference character 7 and said carriage comprises a pair of spaced tubular castings 307 and 308 (Figures 1, 3 and 4) which are adapted to slide upon the spaced horizontal guide bars 26 and are connected by an integral web portion 309. The front wall of the web portion 309 is tangent to the tubular castings 307 and 308 to provide a flush wall surface 310 for receiving an adjustable face plate 311 which is adapted to be held in place by means of anchoring bolts 312 received in arcuately curved slots 313 in the face plate 311 so as to permit adjustment of said face plate about its center.

Hingedly secured to the face plate 311 is a reciprocating tool carrying plate 314 and said plate is notched at its upper end as at 315 for receiving hinge lugs 316 carried by and formed integral with the face plate 311. Pintle bolts 317 are passed through the lugs 316 and have their inner ends threaded in threaded openings 318 extending inwardly from the notched end 315.

Secured to the hinged tool supporting plate 314 is a tubular bearing member 319 (Figure 4) which extends rearwardly through enlarged aligned openings 320 and 321 in the face plate 311 and web portion 309. The tubular bearing member 319 is flanged as at 322 and is adapted to be secured to the rear wall of the hinged tool supporting plate 314 by suitable anchoring screws as at 323. The hinged tool supporting plate 314 is provided with a bearing opening 324 which is axially aligned with the bearing opening 325 in the tubular bearing member 319 and rotatably mounted in the bearing portions 324 and 325 is a rotary shaft 326 having an eccentric pin 327 at one end thereof, while the other end is provided with a stepped grooved pulley 328 for being drivingly connected to a motor in a manner which will be hereinafter more fully described.

Formed on the hinged cutting tool support 311 and offset from the center thereof is a tubular guide 329 having a bore 330 for receiving a reciprocating plunger 331. The upper end of the reciprocating plunger 331 is flattened and provided with an elongated slot 332 (Figure 5) for receiving an adjustable bolt 333 carried by the end of a pivoted oscillating lever 334. The diameter of the bolt 333 may be reduced so as to pass through the slot 332 and be held in place by a nut or the like as at 335. The lever 334 is pivoted to a support 336 having depending arms 337 and 338 extending on both sides of the pivoted lever 334, and pivoted thereto by means of a pivot pin 339 carried by a slide block 340 mounted for longitudinal movement in an elongated slot 341 in the pivoted lever 334. The support 336 is provided with a projection 342 (Figure 4) which is slidably received in a slot 343 extending inwardly and transversely of the hinged cutting tool support 314. The support 336 is provided with an opening for receiving a bolt 344 which is adapted to be received in a nut 345 slidably mounted in an undercut slot 346 extending inwardly from and parallel to the slot 343. Tightening of the bolt 344 will cause the nut 345 to clampingly engage the undercut slot 346 and lock the fulcrum support 336 in a predetermined adjusted position. The oscillating lever 334 is connected with the rotary shaft 326 by means of a pitman 347 which has one of its ends pivotally secured as at 348 to the oscillating lever 334 while the other end is received on the eccentric pin 327. A clamping disc 349 is secured to the enlarged head portion 350 of the pitman 347 to retain the same in place and a retaining screw 351 is threaded in an axial bore in the eccentric pin 327 to retain the washer 349 in place. A guide block 353 is secured to the hinged tool supporting plate 314 by means of machine screws or the like as at 354 and said guide block is provided with a guide groove 356 for receiving and guiding one end of the oscillating lever 334 so as to hold the pitman 347 in alignment with the eccentric pin 327. An adjusting screw 357 is threaded in an opening 358 in the hinged tool supporting plate 314 so that the inner end thereof may be received in a threaded opening 359 in the face plate 311. The adjusting bolt 357 is provided with a head having a rounded under portion to permit slight relative movement between the hinged tool supporting plate 314 and adjusting bolt 357.

The drive motor 358 (Figures 3 and 4) has its base 359 mounted on a hinged platform 360 secured to an offset portion 361 extending along the tubular casting 307. The platform 360 is provided with spaced hinge eyes 361 for being coupled to a hinge plate 362 by means of a suitable pintle or the like 363. The free swinging end of the hinge plate 360 is provided with an adjusting screw 364 having a lock nut 365 and thumb piece 366 to facilitate the adjusting thereof in any desired position to compensate for the adjustment of the face plate 311 and tool supporting plate 314 respectively. The armature shaft of the motor 358 is provided with a pulley over which is trained a pulley belt 367 for driving the step pulley 328 on the shaft 326.

The lower end of the reciprocating plunger 331 is provided with an axial bore 368 for receiving the shank portion of an adapter 369 to which is hinged a tool holding chuck 370 as at 371. The chuck 370 is arranged with the hinge point 371 offset from the center thereof and a small leaf spring 372 is secured to the adapter 369 as at 373 so that the free end thereof will engage the chuck 370 and urge the chuck in a straight line position. A cutting tool 374 is mounted in a socket 375 in the chuck 370 and said cutting tool is provided with a cutting portion 376 at the lower end thereof. Set screws 377 and 378 are provided for holding the adapter 369 in the bore 368 and the tool 374 in the bore of the chuck 375 respectively.

In order to adjust the face plate 311 an adjusting cam 379 (Figures 3 and 5) is mounted on a stub shaft 380 which has one of its ends reduced as at 381 for reception in an opening 382 in the web 309. The cam 379 is cut away as at 383 to provide a disc portion 384 which is graduated as at 385. A pointer is adapted to register with the graduations 385 and includes a block 386 affixed to the web 309 by means of machine screws or the like 387. The cam 379 is positioned so that its peripheral edge is in engagement with one of the edges of the adjustable face plate 311 so that turning said cam by means of a knurled portion 388 said plate may be moved about its center as permitted by the adjusting screws 312 and the arcuate slots 313. A knurled set screw 389 is threaded in the knurled handle portion 388 so as to lock the cam 379 in a predetermined adjusted position on the shaft 380. The block 386 is provided with an extension 390 which overlies the cutaway portion 383 of the cam so that an indicating mark 391 may register with the graduations 385 and thereby indicate the number of degrees of angular movement of the plate 311 about its center.

In order to hold the tubular castings 307 and 308 in a predetermined set position, the clamping screws 392 and 393 (Figure 4) are passed therethrough so that the inner ends will engage the slide bars 26 and hold the tool carriage in position. The clamping screws 392 and 393 are provided with handles 394 and 395 respectively so as to obtain clamping leverage or purchase when tightening or loosening the screws.

Extending between the frame uprights 19 and 20 is a rotary screw feed shaft 396 (Figure 1) having one of its ends journalled as at 397 in the upright 20 and its opposite end journalled in a bearing portion 398 in the upper end of the upright 19. The cutting tool supporting carriage 7 is mounted in front of the rotary screw feed shaft 396 so that a bracket member 399 (Figure 4) may be drivingly engaged thereby and said bracket member is fastened to the rear wall of the web 309 by means of screws or the like 400.

As shown clearly in Figures 1, 2 and 17, the screw feed shaft 396 extends into the bearing portion 398 of the upright 19 and is reduced as at 401 so that the free end thereof as at 402 may project through an opening 403 in opposed relation to the bearing portion 398 for receiving a hand wheel or the like as at 404. A manual operating hand wheel 405 is secured to the handle 404 so as to rotate the screw feed shaft 396 manually.

The annular bearing portion 398 is provided with a bore 406 in which there is received a sleeve 407 having an annular flange 408. The sleeve 407 forms an abutment for a gear casing 409 which is secured to the annular bearing portion 398 by bolts which extend through a flange 411 formed on the gear casing 409 and have their ends received in screw-threaded openings in the annular bearing portion 398. The sleeve 407 is provided with an internal flange 412 thereby forming a chamber for receiving and housing an annular enlarged portion 413 of the screw feed shaft 396 which is adapted to engage an abutment ring 414 which is threaded within the sleeve 407 as at 415. A cup-shaped abutment 416 is also received in the sleeve 407 and has a portion thereof engaging the annular enlargement 413 and a portion engaging the inwardly directed flange 412. A ring-like member 417 is secured to the sleeve 407 by means of machine screws 418 and said ring-like member is provided with an indicating mark 419 adapted to register with a series of graduations 420 on a graduated disc 421. The hub 422 of the graduated disc 421 is adapted to be locked or secured to the rotary screw feed shaft 396 by means of a knurled set screw 423.

Rotatably carried by the sleeve 407 (Figure 17) is a tubular shaft 424 which has formed on one end thereof a bevel gear 425 while the other end is threaded for receiving a locking nut 426 to prevent endwise movement of the tubular shaft 424 but yet permit rotation thereof on the shaft 401. Formed integral with the gear casing 409 is a bearing portion 427 in opposed relation with the annular flange 412 and axially aligned therewith for receiving the tubular shaft 428 carrying a bevel gear 429. A retaining nut 430 is threaded on the tubular shaft 428 to prevent endwise movement thereof in identically the same manner as the retaining nut 426. Also formed integral with the gear casing 409 is an offset housing portion 431 having a bearing portion 432 and a cover 433 provided with a bearing portion 434 for receiving a stub shaft 435. Keyed as at 437 to the stub shaft 435 is a worm wheel 436 and said worm wheel is adapted to be driven by a worm 438 suitably journalled in the offset portion of the gear casing 431. One end of the stub shaft 435 projects into the gear casing 409 and is provided with a bevel gear 439 which is keyed thereto as at 440. The bevel gear 439 is interposed between the bevel gears 425 and 429 so as to simultaneously be in driving engagement therewith and as noted above, the bevel gears 425 and 429 are mounted for free rotation with respect to the shaft 401 and are adapted to be connected therewith by means of the reversing clutch including opposed clutch elements 441 and 442 for being received in clutch recesses 443 and 444 respectively in the bevel gears 425 and 429. The clutch elements 441 and 442 are formed integral and are movable alternately into engagement with the clutch recesses 443 and 444. The clutch shifting lever 445 is pivoted as at 446 to a bracket 447 secured to the gear housing 409 so that the free ends of the clutch shifting lever 445 may project externally of the gear casing 409 and be provided with a handle 448 for the purpose of manually controlling the same. The inner end of the shifting lever 445 is provided with a pin 449 which is received in an annular groove 450 in the movable clutch element so that when the lever 445 is oscillated between the limits of its two positions of movement, the clutch elements 441 and 442 will engage their respective recesses 443 and 444. The clutch elements 441 and 442 are keyed to the shaft 401 by means of a key or gib 452 so as to be free to slide longitudinally of the shaft 401 but yet be restrained against relative rotational movement. The drive worm 438 has its shaft extending externally of the offset portion of the gear casing 431 for connection with a drive shaft 454 (Figure 1) which is adapted to be connected to an electric motor controlled by a thymotrol speed reduction unit.

Also extending between the frame uprights 19 and 20 is a graduated bar 455 which has one of its ends received in a tubular bracket 456 (Figure 1) while its opposite end is connected to an offset bracket 457 (Figure 2) secured to the upright 19 by machine screws or the like 458. The offset bracket 457 is connected to the graduated bar 455 by means of a screw or the like as at 459. A series of graduations 460 are formed on the graduated bar 455 so as to determine the position of the cutting tool frame 7 when the same is moved either manually or mechanically by control of the hand wheel 404 or mechanical operation of the drive shaft 454. Secured to the web portion 309 of the cutter carriage 7 and extending parallel with the graduated bar 455 is an elongated pin 461 upon which is mounted an adjustable slide box 462 having a pointer 463 adapted to register with the graduations 460 on the graduated bar 455. A set screw 464 is threaded in the adjustable block 462 to permit adjustment of the block and pointer 463 to predetermined positions of adjustment.

Operation of the invention

While the machine tool above described is primarily intended for making male and female die members, it is to be understood that the same may be used for various other cutting operations in substantially the same manner as conventional milling machines for producing the same work accomplished thereon. The operation of the invention will be described in connection with the formation of a die member having radially extending slots rounded at the ends on a predetermined arc with the slots connected by a similarly curved portion adjacent the center of the die.

In operation, the work piece or stock is placed on the indexing head 238 and secured thereto by means of suitable fixtures fastened in place by bolts secured in the undercut slots 287. After the work is thus positioned, the compound slide 8, including the slides 202 and 243 is centered with respect to the rotary table 6 and the machine tool carriage 7 is positioned so as to bring the cutting tool 374 into registry or alignment with the center of the work and center of the indexing head 238. It is to be understood that an indexing disc 288 (Figures 6 and 8) having a number of notches 294 equal to the number of radial slots in the work piece has been provided and securely clamped between the drum 273 and indexing head 238. After the parts have thus been arranged, the motor 358 is started to cause reciprocation of the tool through the medium of the pitman and crank level 347 and 334 respectively (Figures 1 and 3). Next, the compound slide 8 is moved to cause the work to be cut along a radial path from the center thereof to cut or form one of the walls of one of the radial slots depending upon the position of the notches in the indexing plate 288. After the compound slide has been moved to accomplish the radial cut, in the above manner, the rotary work table 6 may be rotated a predetermined angular distance to produce an arcuate cut at the end of one of the walls of said slot so that the work piece may then be moved in a radial straight line path or returned to the center thereof and to the center of the indexing head, compound slide and rotary table 6. At this time it may be well to state that the radial slots in the work piece are formed by drilling a series of radially aligned holes extending from the center a distance equal to the length of slot desired or approximately so, whereby the cutting tool 374 may cut the walls formed by said series of radially aligned bore holes to the exact dimensions. In various workpieces it is desirable to arcuately curve the intersecting point of the slots and to facilitate the curving of said portions, the compound slides 202 and 243 are offset so as to position the work beneath the tool so that partial rotation of the rotary table 6 will swing the work about an arc as desired.

As a concrete example, let it be supposed that a work piece is to be cut with a slot 2 inches long extending from the center thereof to the outer portion of the work piece and that the slot is to be formed approximately .5 of an inch. With the parts in their central position, including the compound slide 8, indexing head 9, and with the work positioned on the indexing head, the tool supporting carriage 7 is shifted approximately .25 of an inch equal to the radius of the curve of the slot. In addition, the slide 202 is shifted two inches from its central position as shown in Figure 1 by manipulating the hand wheel 223 so as to move the slide a corresponding distance denoted by the graduated scale 193a and pointer 202a. After the slide 202 has thus been shifted a distance of two inches minus the .25 of an inch or radius of arc desired, so as to move the center of said arc in alignment with the center of said rotary table 6, the next thing to determine is the angular movement of the table 6 so as to produce an arc of approximately 180 degrees. In determining the length of arcuate movement of the rotary table 6 for cutting arcs of 180 degrees and less, the sine of the angle can be found since the distance from the center of the work piece to the center of arc is known as is also the width of said slot and thus by triangulation the angle of movement of the rotary table 6 can be easily computed to the exact degree. When it is desired to cut an arc of less than 180 degrees, the angular rotational movement of the rotary table 6 is found by dividing one half of the width of the slot by the radius thereof so as to find the sine of the angle through which the rotary table 6 is to be moved. Once the sine of the angle is determined, the number of degrees of movement can be found by consulting trigonometric tables. For work pieces having arcuate slots requiring only a ten degree movement of the rotary table 6, the hand wheel 169 is rotated and turned a sufficient amount so as to rotate the support 6 a distance equal to the distance between the graduations 149 and thereby turn said table about said work piece through an angular distance by the required amount.

When it is desired to form arcuate cuts in the work piece about an angular distance other than increments of ten degrees, the rotary table 6 is adjusted to the predetermined settings in multiples of ten degrees and the micrometric adjustment including the adjusting rod 100 and oscillatable lever 56 are shifted by manipulating the hand wheel 126 a predetermined amount in accordance with the graduations 134 on the hand wheel and graduations 134a on the control rod 100. As noted above, the graduations 134 are adapted to represent linear distance corresponding to the sine of the angle desired, such as degrees, minutes and seconds, so that the rotary work table may be set to all positions of angular adjustment with the adjustment of the table by the hand wheel 169 and detent 67 taking care of angular distances of 10 degrees and the adjustment of the hand wheel 126 accommodating adjustment of the rotary table to angular distances or positions of adjustment between the 10 degree intervals.

Should it be desired to form or cut an arcuate recess or groove in a work piece having a predetermined radius at various locations in the work piece offset from the straight line movement of the slides 202 and 243, the slides are manipulated by operation of the hand wheels 223 and 261 so as to offset the work piece by a predetermined amount and position the same with respect to the cutting tool which has likewise been offset from the center of the rotary work table 6 a distance equal to the radius of cut desired. With the work piece and cutting tool thus offset, various arcuate cuts may be formed therein and if desired, the cutting tool may be angled by manipulating the adjusting cam 379 so as to reciprocate the cutting tool along a line angled slightly to a perpendicular position. In certain cases of die cutting, it is desirable to slightly taper the wall of the die opening and by simply turning the cam 379 a predetermined angular distance, the face plate 311 and hinged cutting tool support 314 may be moved a corresponding distance about their center so as to angularly position the cutting tool for the tapering of the die walls.

Obviously, cuts of different shapes and designs may be produced by manipulating the various controls for the rotary table 6, tool carriage 7, compound slide 8 and indexing head 9. During the cutting of straight line cuts, the screw feed shaft 296 for the cutting tool carriage 7 may be operated by the thymotrol speed reduction motor, or as above described may be controlled by the handle 404 by simply shifting the lever 445 thereof. Similarly, the slides 202 and 243 may be mechanically driven while making various straight line cuts by manipulating the knurled hand control 238 so as to drivingly connect the screw feed shafts 207 and 251 with their respective thymotrol speed reduction units and motors. During arcuate cuts, the work may be rotated by the drive mechanism shown and described in Figures 15 and 16 by shifting the lever 92 through the medium of the hand control knob 90 so as to connect the thymotrol speed reduction motor unit with the worm 185 or in the case of being manually operated, with the hand wheel 169. As pointed out above, the locking bolt 67 for the rotary table 6 is adapted to position the table so that the pointer 152 will register with one of the ten degree markings 149 or graduations on the bevel surface 148 of said table. In this manner, the table is located in an exact angular position at ten degree intervals and by adjusting the rod 180 through rotation of the hand wheel 126, the locking bolt may be shifted to position the same between angular distances less than ten degrees.

By reason of the thymotrol speed reduction motor units which are employed for rotating the table 6, operating the compound slide 8 and moving the tool supporting carriage 7, the machine may be operated mechanically without requiring the use of manual controls therefor, such as the various manually controlled hand wheels for the parts above enumerated.

It is to be understood that after a radial cut is made, as above pointed out in the work piece, the lever 303 (Figures 6 and 8) may be swung so as to withdraw the detent 302 from its detent opening 294 so that the indexing head 283 may be shifted to a new angular position whereupon said detent 302 will fall into another one of said detent openings 294. The clamping plate 305 is employed during the initial setting of the indexing head 283 with the detent 302 in one of the detent openings 294 so as to correctly position the work with respect to the rotary table or support 6 and compound slide 8.

It is to be understood that the form of the invention herewith shown and described is to be taken as a preferred embodiment of the same and that various changes may be made in the shape, size and arrangement of parts without departing from the spirit of the invention or the scope of the subjoined claims.

What I claim is:

1. In a machine tool having a base with a vertical frame structure and a tool carrier mounted thereon, the combination of a turntable rotatably mounted on said base on a vertical axis of rotation, mechanism for rotating said turntable, a slide reciprocably mounted upon said turntable for motion diametrically thereof, mechanism for reciprocating said slide, a cross-slide reciprocably mounted upon said slide for motion transversely to said slide, mechanism for reciprocating said cross-slide, and a rotary work-holder rotatably mounted upon said cross-slide.

2. In a machine tool having a base with a vertical frame structure and a tool carrier mounted thereon, the combination of a turntable rotatably mounted on said base on a vertical axis of rotation, mechanism for rotating said turntable, a slide reciprocably mounted upon said turntable for motion diametrically thereof, mechanism for recirprocating said slide, a cross-slide reciprocably mounted upon said slide for motion transversely to said slide, mechanism for reciprocating said cross-slide, a rotary work-holder rotatably mounted upon said cross-slide, and a rotary indexing device operably interconnecting said workholder and said cross-slide.

FERDINAND J. HENKEL.

REFERENCES CITED

The following references are of record in the file of this patent:

UNITED STATES PATENTS

| Number | Name | Date |
|---|---|---|
| 299,496 | Richards | May 27, 1884 |
| 360,530 | Kaufholz | Apr. 5, 1887 |
| 846,728 | Cochrane et al. | Mar. 12, 1907 |
| 1,084,544 | Hanson et al. | Jan. 13, 1914 |
| 1,687,350 | Rollings | Oct. 9, 1928 |
| 1,745,573 | Harten | Feb. 4, 1930 |
| 1,968,514 | Brustle | July 31, 1934 |
| 2,277,997 | Silva | Mar. 31, 1942 |
| 2,414,033 | Fawkes | Jan. 7, 1947 |

FOREIGN PATENTS

| Number | Country | Date |
|---|---|---|
| 353,992 | Italy | Nov. 6, 1937 |